US008169749B2

(12) United States Patent
Keshavan et al.

(10) Patent No.: US 8,169,749 B2
(45) Date of Patent: May 1, 2012

(54) POST-ASSEMBLY HEAD/DISK OFFSET ADJUSTER (75) Inventors: Manoj Keshavan, San Jose, CA (US); Jr-Yi Shen, Sunnyvale, CA (US)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 976 days.

(21) Appl. No.: 11/805,498

(22) Filed: May 22, 2007

(65) Prior Publication Data
US 2008/0291567 A1    Nov. 27, 2008

(51) Int. Cl.
*G11B 5/48* (2006.01)
*G11B 5/55* (2006.01)

(52) U.S. Cl. .................................................... 360/265.6

(58) Field of Classification Search ................ 360/77.02, 360/265.6, 265.7, 290, 294, 265.9, 294.7
See application file for complete search history.

(56) References Cited

U.S. PATENT DOCUMENTS

| | | | |
|---|---|---|---|
| 3,208,056 A | 9/1965 | Pearson et al. | |
| 4,286,298 A | 8/1981 | Rinkleib | |
| 4,506,857 A * | 3/1985 | Hara et al. | 248/655 |
| 4,764,829 A | 8/1988 | Makino | |
| 4,772,972 A | 9/1988 | Maeda | |
| 4,982,300 A | 1/1991 | Forbord | |
| 5,590,002 A | 12/1996 | Bracken et al. | |
| 5,867,471 A * | 2/1999 | Kim et al. | 720/697 |
| 6,005,836 A * | 12/1999 | Choi | 720/697 |
| 6,388,982 B2 * | 5/2002 | Ogusu | 369/264 |
| 6,697,230 B1 * | 2/2004 | Nayak | 360/267.4 |
| 6,717,776 B2 | 4/2004 | Boutaghou | |
| 6,751,064 B2 | 6/2004 | Kuwajima et al. | |
| 6,772,428 B2 * | 8/2004 | Kim et al. | 720/697 |
| 6,798,613 B1 | 9/2004 | Krajnovich et al. | |
| 6,951,026 B2 * | 9/2005 | Kageyama et al. | 720/697 |
| 7,079,356 B2 | 7/2006 | Kasajima et al. | |
| 7,141,969 B2 * | 11/2006 | Guzik | 324/261 |
| 7,480,926 B2 * | 1/2009 | Lu | 720/697 |
| 7,570,460 B2 * | 8/2009 | Kitahori et al. | 360/265.6 |
| 2006/0126227 A1 | 6/2006 | Kitahori et al. | |

FOREIGN PATENT DOCUMENTS

JP    62170028    7/1987

(Continued)

OTHER PUBLICATIONS

Draper, S W., "Flying Height Control in Disk File", *IBM TDB*, (Dec. 1987), 409ff.

(Continued)

*Primary Examiner* — Angel A. Castro (57) ABSTRACT

A post-assembly head/disk offset adjuster is disclosed. One embodiment provides a housing and at least one disk coupled with the housing. In addition, an adjustable pivot plate is coupled with the housing such that access to at least one adjustment point of the adjustable pivot plate is provided regardless of a state of assembly of the hard disk drive. Furthermore, an actuator is coupled with the adjustable pivot plate. In so doing, an adjustment to the at least one adjustment point of the adjustable pivot plate results in an adjustment to the actuator regardless of the state of assembly of the hard disk drive.

18 Claims, 6 Drawing Sheets

FOREIGN PATENT DOCUMENTS

| | | |
|---|---|---|
| JP | 63311675 | 12/1988 |
| JP | 1146361 | 10/1989 |
| JP | 1319136 | 12/1989 |
| JP | 2287982 | 11/1990 |
| JP | 310368 | 1/1991 |
| JP | 420663 | 2/1992 |
| JP | 4134777 | 5/1992 |
| JP | 11025466 | 1/1999 |
| JP | 2000099931 | 4/2000 |

OTHER PUBLICATIONS

Shoji, N T., et al., "Asymmetrical Head Disk Alignment", *IBM TDB*, vol. 37, Pub No. 12, (Dec. 1994),181ff.

\* cited by examiner

```
┌─────────────────────────────────────────────────────────────┐
│  COUPLES AN ADJUSTABLE PIVOT PLATE TO A BASE PORTION OF A   │
│    HARD DISK DRIVE HOUSING COMPRISING AT LEAST ONE DISK.    │
│                            502                              │
└─────────────────────────────────────────────────────────────┘
                              │
                              ▼
┌─────────────────────────────────────────────────────────────┐
│    PROVIDES ACCESS TO AT LEAST A PORTION OF THE ADJUSTABLE  │
│   PIVOT PLATE SUCH THAT AN ADJUSTMENT TO THE ADJUSTABLE PIVOT│
│    PLATE MAY BE MADE REGARDLESS OF A STATE OF ASSEMBLY OF THE│
│                      HARD DISK DRIVE.                       │
│                            504                              │
└─────────────────────────────────────────────────────────────┘
                              │
                              ▼
┌─────────────────────────────────────────────────────────────┐
│  RECEIVES AN ACTUATOR HAVING A SUSPENSION FOR REACHING OVER │
│    THE DISK, THE SUSPENSION HAVING A SLIDER COUPLED THEREWITH,│
│    THE SLIDER HAVING A READ/WRITE HEAD ELEMENT ON A TRAILING│
│                       EDGE (TE) PORTION.                    │
│                            506                              │
└─────────────────────────────────────────────────────────────┘
                              │
                              ▼
┌─────────────────────────────────────────────────────────────┐
│    COUPLES THE ACTUATOR TO THE ADJUSTABLE PIVOT PLATE, SUCH │
│  THAT AN ADJUSTMENT PERFORMED ON THE ADJUSTABLE PIVOT PLATE │
│  WILL RESULT IN AN ADJUSTMENT TO AN OFFSET BETWEEN THE READ/│
│   WRITE HEAD ELEMENT AND A SURFACE OF THE DISK REGARDLESS OF│
│        THE STATE OF ASSEMBLY OF THE HARD DISK DRIVE.        │
│                            508                              │
└─────────────────────────────────────────────────────────────┘
```

FIG. 5

POST-ASSEMBLY HEAD/DISK OFFSET ADJUSTER

TECHNICAL FIELD

The present invention relates to the field of hard disk drive development, and more particularly to a method and system for post-assembly adjustment of the head/disk offset.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

However, the small drives have small components with very narrow tolerances. Disk drive sliders are designed to fly in very close proximity to the disk surface. For instance, in some systems the slider may be designed to fly only three to five nanometers above the disk surface. Moreover, in many hard disk drives, there is a disk stack and usually a read/write head associated with each side of a disk in the stack.

In many cases, to reduce cost, a single suspension will be used between the top of a first disk and the bottom of a second disk, the suspension will usually have a top slider with a read/write head and a bottom slider with a read/write head. Thus, a single suspension will be able to be utilized between the two disk surfaces at a great savings in cost and complexity.

However, one problem with utilizing a single suspension is the offset between the read/write heads and the two disk surfaces. For example, if the top read/write head is a bit closer to the disk, then the bottom read/write head may be a bit too far away, or vice-versa. These variations in the magnetic spacing between the head element and media are likely to cause data errors—both hard errors during writing and soft errors during reading.

This shortcoming becomes even more deleterious as the actual offset distances and overall components are reduced in size.

SUMMARY

A post-assembly head/disk offset adjuster is disclosed. One embodiment provides a housing and at least one disk coupled with the housing. In addition, an adjustable pivot plate is coupled with the housing such that access to at least one adjustment point of the adjustable pivot plate is provided regardless of a state of assembly of the hard disk drive. Furthermore, an actuator is coupled with the adjustable pivot plate. In so doing, an adjustment to the at least one adjustment point of the adjustable pivot plate results in an adjustment to the actuator regardless of the state of assembly of the hard disk drive.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for providing post-assembly adjustment of a head/disk offset in particular.

Overview

In general, embodiments of the present invention provide a method and apparatus for providing post-assembly adjustment of a head/disk offset. For example, one problem with traditional hard disk drive manufacture is the sum of the tolerances of an assembly such as a head stack assembly (HSA) based on the tolerances of the components that form the assembly. This tolerance issue is readily apparent when looking at the disk surface offset between the top (e.g., even) read/write head and bottom (e.g., odd) read/write head of a single ILS. As one offset is increased, the other is decreased, and vice-versa.

In general, the term offset as used herein is used generically to refer to differences such as asymmetric z-offset, angle, distance, pitch, roll, and the like between the read/write head and disk surface. For example, if a HSA is shifted down toward a disk a higher down-tracking bending motion of the down facing heads may be observed. This motion will couple in the off-track direction mainly from the higher skew angles at the outer diameter (OD) of the disk.

However, by utilizing the post-assembly adjustment of a head/disk offset described herein, the head/disk surface offset irregularities between the top read/write head and bottom read/write head of the HSA is significantly reduced. Moreover, this accuracy is obtained with minimal modification to the overall HDD manufacturing process. In other words, HDD manufacturers can fine tune the desired HSA position relative to the disk after assembly.

Operation

Figure 1A:
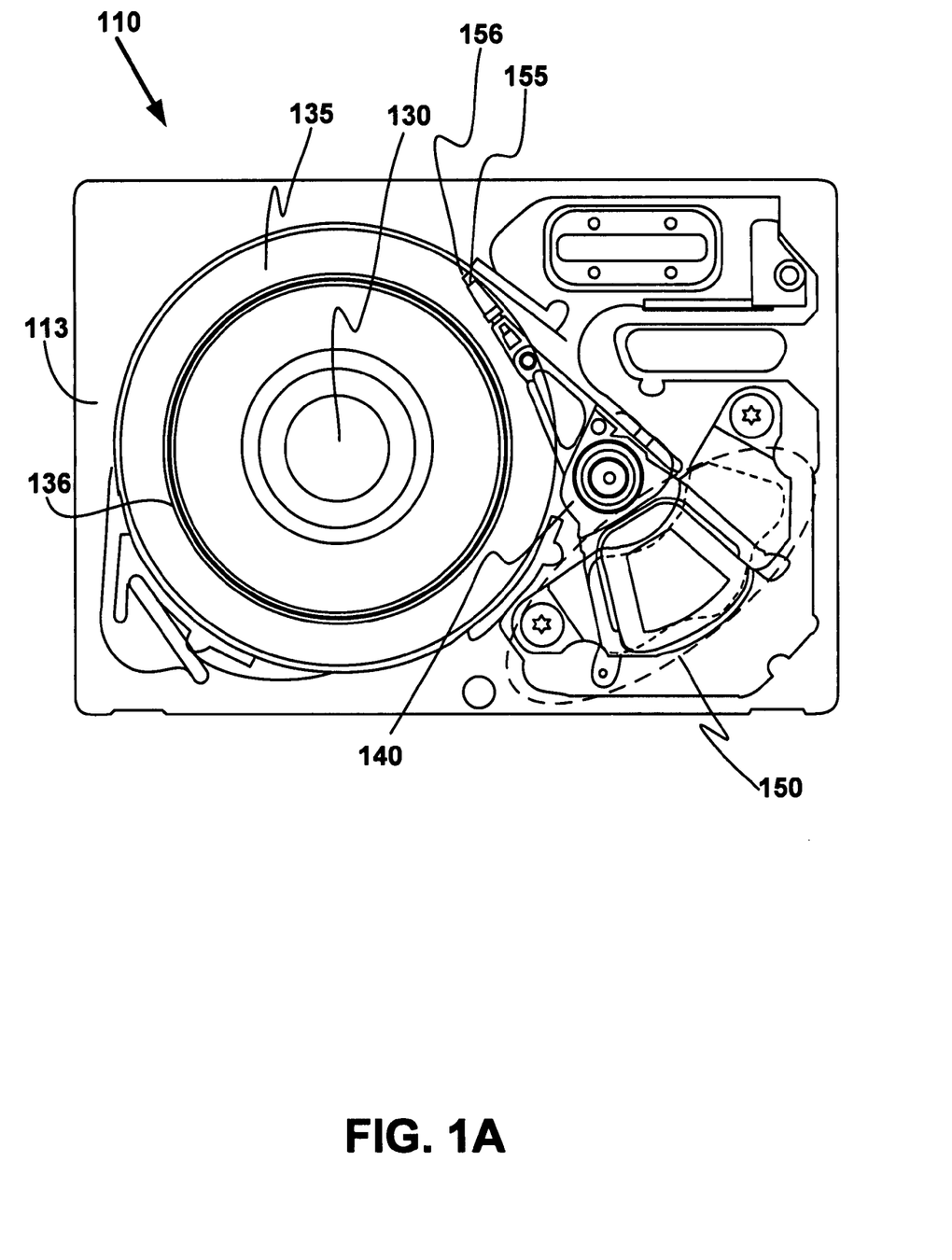
FIG. 1A is a plan view of an HDD with cover and top magnet removed in accordance with one embodiment of the present invention.

With reference now to FIG. 1A, a schematic drawing of one embodiment of an information storage system comprising a magnetic hard disk file or drive 110 for a computer system is shown. Hard disk drive 110 has an outer housing or base 113 containing a disk pack having at least one media or magnetic disk 138. The disk pack (as represented by disk 138) defines an axis of rotation and a radial direction relative to the axis in which the disk pack is rotatable.

A spindle motor assembly having a central drive hub 140 operates as this axis and rotates the disk 138 or disks of the disk pack in the radial direction relative to housing 113. An actuator 120 comprises a plurality of parallel actuator arms 155 in the form of a comb that is movably or pivotally mounted to base/housing 113 about a pivot assembly 140. A controller 150 is also mounted to base 113 for selectively moving the comb of arms relative to the disk pack (as represented by disk 138).

In the embodiment shown in FIG. 1A, each arm 125 has extending from it at least one cantilevered integrated lead suspension (ILS) 129. The ILS 129 may be any form of lead suspension that can be used in a data access storage device, such as a hard disk drive (HDD). The slider 155 is usually bonded to the end of ILS 129, both of which are attached to a suspension 127. Suspension 127, in this embodiment, is used as a pathway to provide an electrical connection to the slider 155. Portions of slider 155, in this embodiment, are electrically isolated from ground, and in some embodiments are also electrically isolated from suspension 127. The level of integration containing the slider, suspension, ILS, and read/write head (not shown) is called the Head Gimbal Assembly (HGA).

The ILS 129 has a spring-like quality, which biases or presses the air-bearing surface of slider 155 against disk 138 to cause slider 155 (see FIG. 2) to fly at a precise distance from disk 138. ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to actuator arms 125 opposite the head gimbal assemblies. Movement of the actuator 150 by controller 140 causes the head gimbal assemblies to move along radial arcs across tracks on the surface 135 of disk. The head gimbal assemblies operate in a conventional manner and always move in unison with one another, unless drive 110 uses multiple independent actuators (not shown) wherein the arms can move independently of one another.

Figure 1B:
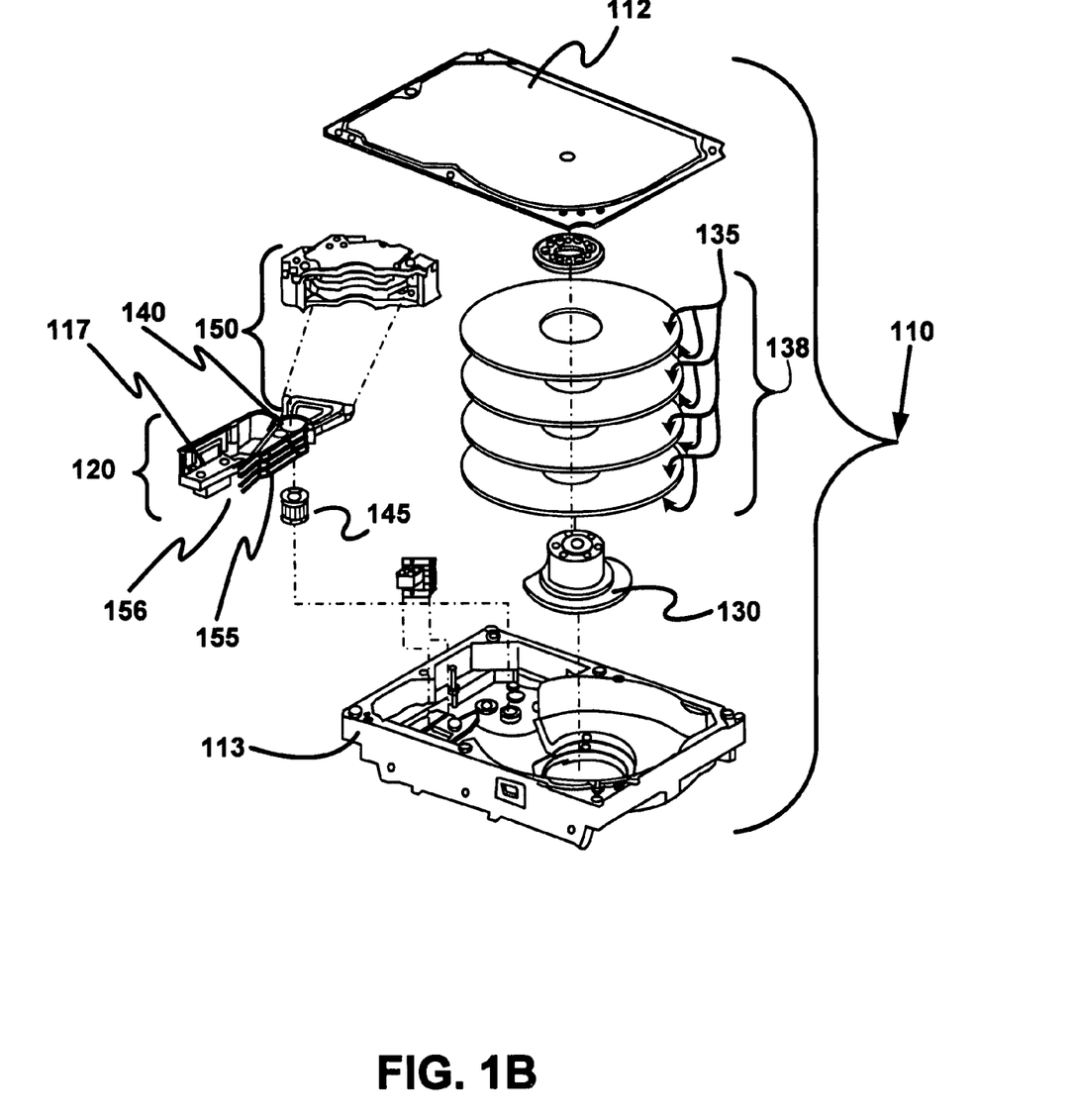
FIG. 1B is an isometric blow-apart of an HDD in accordance with one embodiment of the present invention.

FIG. 1B shows a similar HDD 110, but with all its components in an isometric blow-apart view. The components, such as the plurality of hard disks in a disk stack 138, are assembled into base casting 113, which provides coupling points for components and sub-assemblies such as disk stack 138, voice coil motor (VCM) 150, and actuator assembly 120. Disk stack 138 is coupled to base casting 113 by means of motor-hub assembly 130. Motor hub assembly 130 will have at least one disk 158 coupled to it whereby disk 158 can rotate about an axis common to motor-hub assembly 130 and the center of disk 158. Disk 158 has at least one surface 135 upon which reside data tracks 136. Actuator assembly 120 comprises in part connector 117, which conveys data between arm electronics and a host system wherein HDD 110 resides.

Actuator assembly 120 is coupled pivotally to base casting 113 by means of pivot bearing 145, whereby VCM 150 can move head 156 accurately across data tracks 136. Upon assembly of actuator assembly 120, disk stack 138, VCM 150, and other components with base casting 113, cover 112 is coupled to base casting 113 to enclose these components and sub-assemblies into HDD 110.

Data is recorded onto disk surface 135 in a pattern of concentric rings known as data tracks 136. Disk surface 135 is spun at high speed by means of a motor-hub assembly 130. Data tracks 136 are recorded onto disk surface 135 by means of magnetic head 156, which typically resides at the end of slider 155. FIG. 1A being a plan view shows only one head and one disk surface combination. One skilled in the art understands that what is described for one head-disk combination applies to multiple head-disk combinations. The embodied invention is independent of the number of head-disk combinations.

The dynamic performance of HDD 110 is a major mechanical factor for achieving higher data capacity as well as for manipulating this data faster. The quantity of data tracks 136 recorded on disk surface 135 is determined partly by how well magnetic head 156 and a desired data track 136 can be positioned to each other and made to follow each other in a stable and controlled manner. There are many factors that will influence the ability of HDD 110 to perform the function of positioning magnetic head 156, and following data track 136 with magnetic head 156. In general, these factors can be put into two categories; those factors that influence the motion of magnetic head 156; and those factors that influence the motion of data track 136. Undesirable motions can come about through unwanted vibration and undesirable tolerances of components. Herein, attention is given to post-assembly adjustment of the orientation of motor-hub assembly 130, which attaches to base casting 113, and in particular, attention is given to the head disk offset of the HDD.

Figure 2:
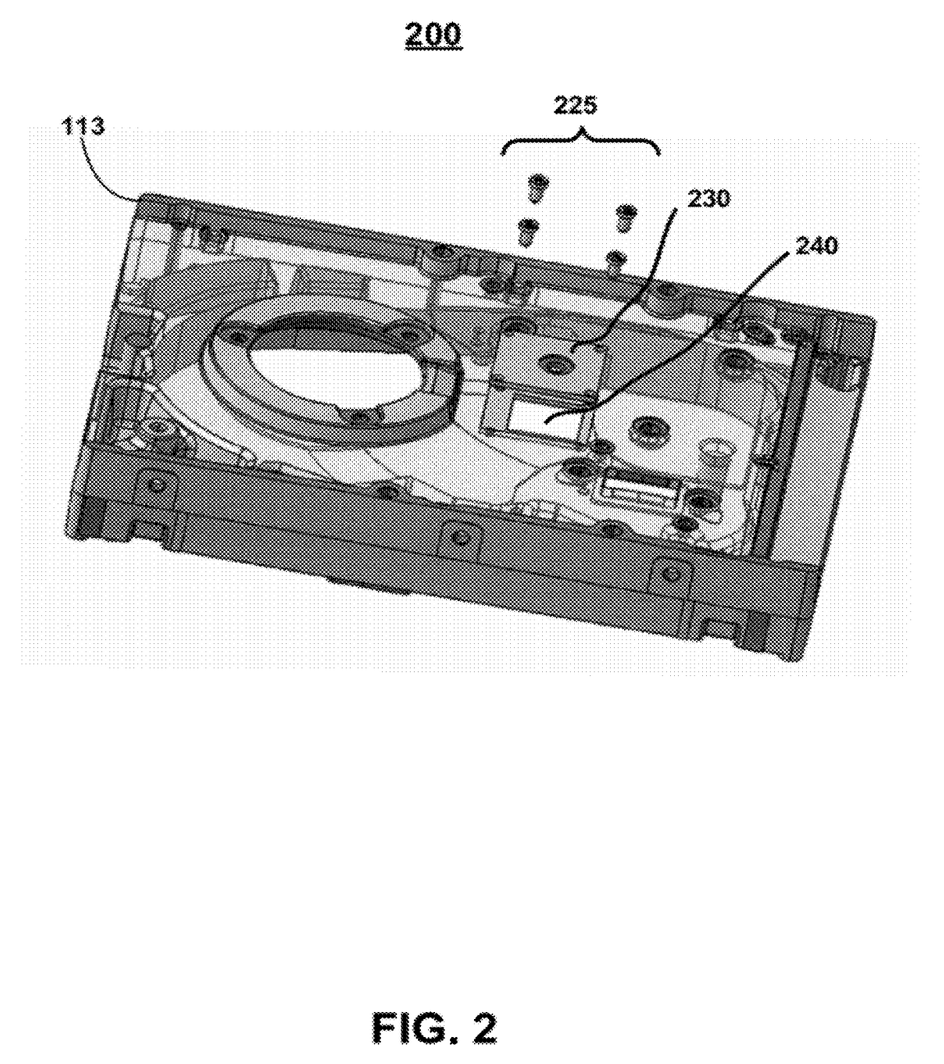
FIG. 2 is an isometric blow-apart view of the HDD housing and adjustable pivot plate in accordance with one embodiment of the present invention.

With reference now to FIG. 2, an isometric blow-apart view of the HDD housing 113 and adjustable pivot plate 230 is shown in accordance with one embodiment of the present invention. In one embodiment, housing 113 is manufactured in the same manner with the only modification being the addition of adjustable pivot plate 230. However, housing 113 may also require an opening 240 to provide access to adjustable pivot plate 230.

In another embodiment, instead of one large opening 240, housing 113 may include a plurality of smaller openings that provide access to any of the adjustment points 225. In FIG. 2, the adjustment points 225 are shown as screws, however, the adjustment points may be any number of adjustable connectors such as, but not limited to, a push pin, a shim, or the like.

Figure 3:
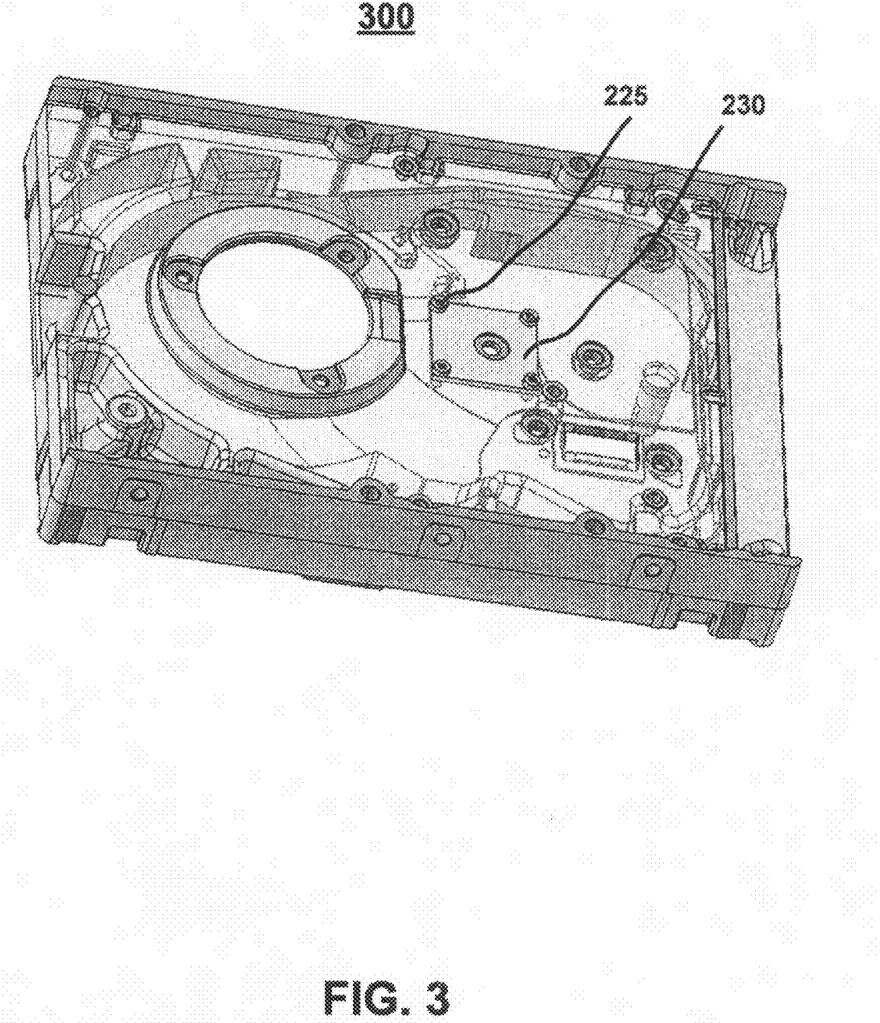
FIG. 3 is an isometric view of the HDD housing with the coupled adjustable pivot plate in accordance with one embodiment of the present invention.

Referring now to FIG. 3, an isometric view of the HDD housing 113 with the coupled adjustable pivot plate 230 is shown in accordance with one embodiment of the present invention. In general, assembly 300 is similar to that of assembly 200. Assembly 300 is shown herein merely to provide one example for coupling adjustable pivot plate 230 with housing 113.

Figure 4:
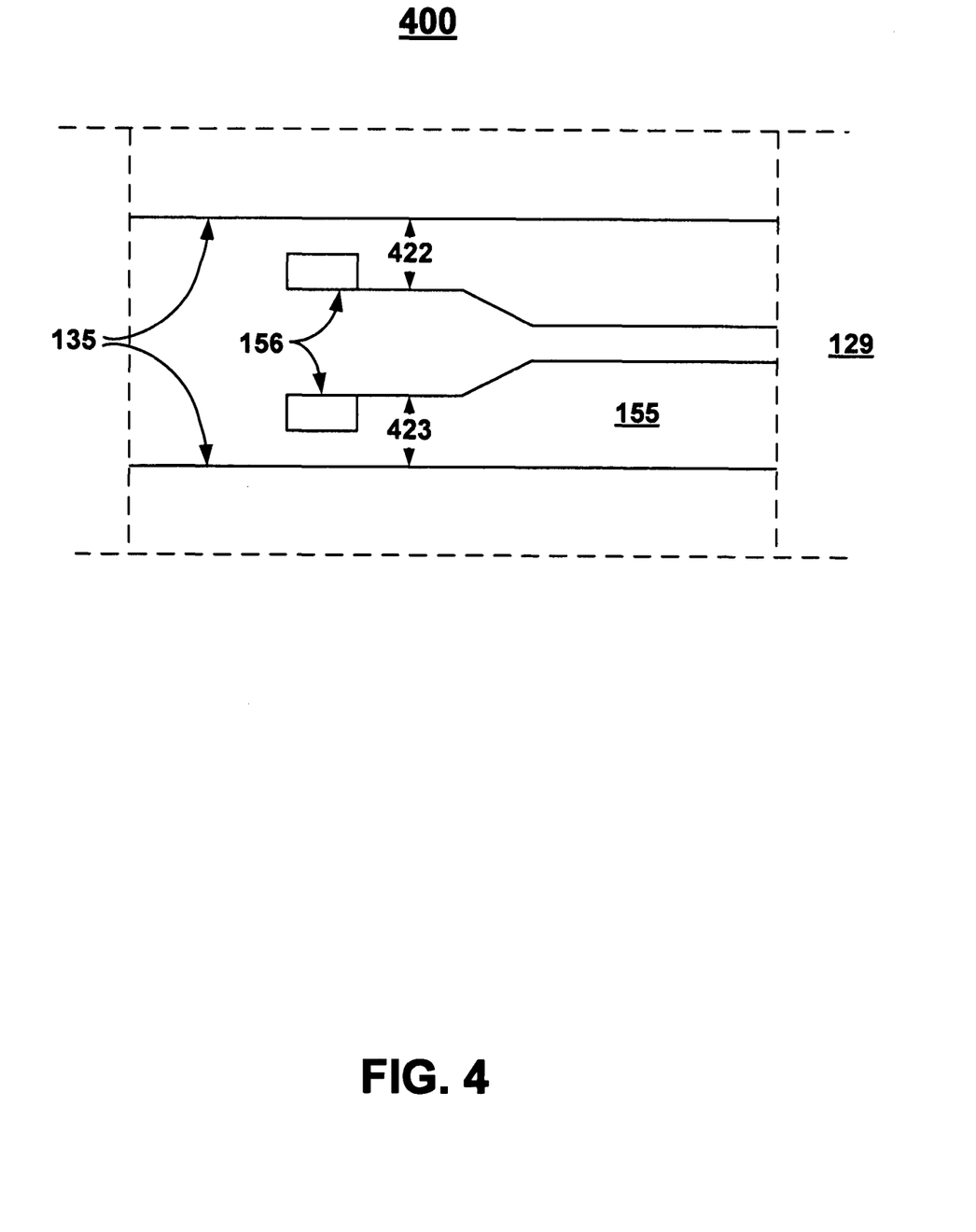
FIG. 4 is a block diagram of head/disk offset in accordance with one embodiment of the present invention.

With reference now to FIG. 4, a block diagram of head 156 disk surface 135 offset is shown in accordance with one embodiment of the present invention. In general, diagram 400 illustrates the integrated lead suspension (ILS) 129 having a slider 155 and read/write head 156 thereon. Moreover, diagram 400 illustrates the offset 422 between the top read/write head 156 and disk surface 135 as well as the offset 423 between the bottom read/write head 156 and disk surface 135. Due to the single integrated lead suspension (ILS) 129 between the disk surfaces 135, the interrelationships of offsets 422 and 423 are obvious.

That is, if offset 422 is increased then offset 423 is reduced, and if offset 422 is reduced, then offset 423 is increased. This interrelationship has significantly affected manufacturing tolerances for each component making up the HGA. That is, the tolerance for ILS 129, slider 155 and read/write head 156 at a minimum must be closely monitored. Moreover, even with tight tolerances, and the related incurred expenses, the HGA assembly will have a resulting tolerance that is the sum of all of the tolerances of the components that make up the assembly. In other words, the HGA tolerance will be no better than the sum of its parts tolerances'.

However, by utilizing the adjustable pivot plate 230 of the present technology, the need for tighter tolerances can be significantly reduced while the actual offset 422 and offset 423 can be better defined. That is, since the adjustable pivot plate 230 now allows for the adjustment of actuator 120 and accordingly read/write head 156, the offsets 422 and 423 can be readily adjusted to fit within the manufacturing and operational specifications. Moreover, the adjustment to adjustable pivot plate 230 can be designed to any degree of freedom. As such, significant savings in component manufacturing costs can be achieved by reducing or maintaining component tolerances while the actual read/write head 156 disk surface 135 offset tolerances of the hard disk drive 110 will be maintained or even increased.

Figure 5:
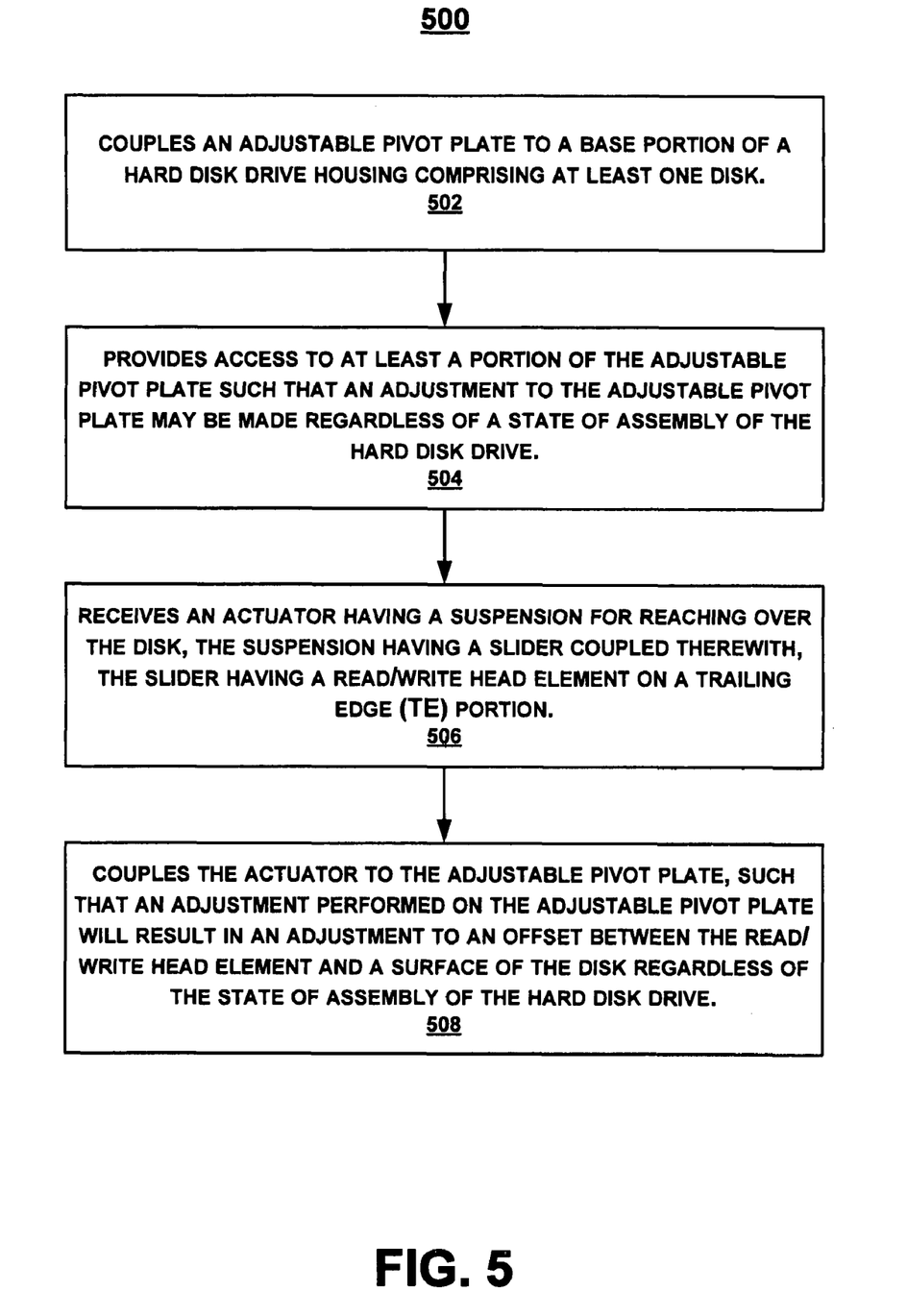
FIG. 5 is a flowchart of a method for providing post-assembly adjustment of a head/disk offset in accordance with one embodiment of the present invention.

Referring now to FIG. 5, a flowchart of a method for providing post-assembly adjustment of a head/disk offset is shown in accordance with one embodiment of the present invention. As described herein, the ability to provide post-assembly adjustment of the head/disk offset allows a rejected assembled HDD having out of tolerance head/disk offset to be placed back within tolerances. In so doing, significant manufacturing costs can be realized.

With reference now to 502 of FIG. 5 and to FIG. 2, one embodiment couples adjustable pivot plate 230 with base portion 200 of a hard disk drive housing 113 comprising at least one disk 138. In one embodiment, a screw is used to couple adjustable pivot plate 230 with base portion 200 of hard disk drive housing 113. For example, the base portion 200 may have an opening or other connection area formed in the previous fixed mounting location for the actuator mount. The adjustable pivot plate 230 will then be fixedly coupled to the housing 113 in the usual actuator mounting location.

In one embodiment, at least one adjustment point 225 is provided for adjustable pivot plate 230 to provide at least one degree of freedom when adjusting adjustable pivot plate 230. In general, adjustment point 225 may be a screw, a push pin, a shim, or the like which may provide an adjustment to adjustable pivot plate 230. For example, after coupling adjustable pivot plate 230 with the base housing 113, there will be at least one degree of freedom available to perform adjustments on the adjustable pivot plate 230 which will ultimately result in an adjustment being performed with regard to the head/disk surface relationship. For example, the single adjustable pivot plate 230 adjustment may translate into a pitch adjustment, a roll adjustment or a z-offset adjustment of the head as the end of the HSA.

However, in another embodiment, at least three adjustment points 225 are provided for adjustable pivot plate 230 to provide at least three degrees of freedom when adjusting the adjustable pivot plate. That is, with three or more adjustment points 225, adjustable pivot plate 230 can be adjusted in the z-offset, pitch and roll. In one embodiment, at least three screws are used for coupling adjustable pivot plate 230 to base portion 200 of hard disk drive housing 113.

Referring now to 504 of FIG. 5 and to FIG. 2, one embodiment provides access 240 to at least a portion of adjustable pivot plate 230 such that an adjustment to adjustable pivot plate 230 may be made regardless of a state of assembly of the hard disk drive 110. In other words, the HDD housing 113 will include an access to at least the device that performs the adjustment on the adjustable pivot plate 230.

With reference now to 506 of FIG. 5 and to FIG. 1B, one embodiment receives an actuator 120 having an integrated lead suspension (ILS) 129 for reaching over disk 138, integrated lead suspension (ILS) 129 having a slider 155 coupled therewith, slider 155 having a read/write head 156 element on a trailing edge (TE) portion. In general, the actuator 120 and associated components are standard components of the HSA and do not need or require any type of modification during manufacture or assembly.

Referring now to 508 of FIG. 5 and to FIGS. 2 and 4, one embodiment couples actuator 120 to adjustable pivot plate 230, such that an adjustment performed on adjustable pivot plate 230 will result in an adjustment to an offset 422 between the read/write head 156 element and disk surface 135 regardless of the state of assembly of hard disk drive 110. However, in some instances, it may be necessary to provide an opening in a controller card of hard disk drive 110 assembly to provide access to adjustable pivot plate 230. Moreover, the coupling of actuator 120 to adjustable pivot plate 230 may be performed in the standard HDD manufacturing process. That is, there is no need to modify actuator 120 or any components therewith, nor is there a need to modify the standard process in which the actuator 120 is assembled within the HDD assembly.

For example, once hard disk drive 110 is assembled, a window in the top of cover 112 may be used to allow measurement of offset 422 or 423 between read/write head 156 element and the disk surface 135 in the assembled hard disk drive 110. This measurement method may be used in a number of ways. In one embodiment, the measurement could be taken and then the adjustable pivot plate 230 would be adjusted to modify the offset 422 or 423 between read/write head 156 element and disk surface 135 based on the taken measurement. However, in another embodiment, the measurement of offset 422 or 423 could be taken constantly or intermittently while the adjustable pivot plate 230 is also being adjusted. Thus, the offset 422 or 423 would be known throughout the adjustment process and the final offset 422 and/or 423 may be more defined.

Thus, embodiments of the present invention provide a method and apparatus for providing post-assembly adjustment of a head/disk offset. Additionally, by providing post-assembly adjustment of a head/disk offset the tolerance requirements for HDD components can be relaxed thereby reducing manufacturing costs without incurring performance loss. Furthermore, embodiments described herein, provide a post-assembly head/disk offset adjuster with little or no modification of the manufacturing or structure of any components other than the base housing.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing post-assembly adjustment of a head/disk offset, said method comprising:
coupling an adjustable pivot plate directly to a base portion of a hard disk drive housing comprising at least one disk;
providing access to at least a portion of said adjustable pivot plate such that an adjustment to said adjustable pivot plate may be made regardless of a state of assembly of said hard disk drive;
receiving an actuator having a suspension for reaching over the disk, the suspension having a slider coupled therewith, said slider having a read/write head element on a trailing edge (TE) portion; and
coupling said actuator directly to said adjustable pivot plate without modifying the actuator or requiring any additional components between the actuator and the adjustable pivot plate, such that an adjustment performed on said adjustable pivot plate will result in an adjustment to an offset between said read/write head element and a surface of said disk regardless of the state of assembly of said hard disk drive.

2. The method of claim 1 further comprising:
providing at least one adjustment point for said adjustable pivot plate, said at least one adjustment point providing at least one degree of freedom.

3. The method of claim 1 further comprising:
utilizing a screw for coupling said adjustable pivot plate to said base portion of a hard disk drive housing.

4. The method of claim 3 further comprising:
measuring said offset between said read/write head element and said disk in an assembled hard disk drive; and
adjusting said adjustable pivot plate to modify said offset between said read/write head element and said disk in said assembled hard disk drive.

5. The method of claim 1 further comprising:
providing at least three adjustment points for said adjustable pivot plate to provide at least three degrees of freedom for adjusting said adjustable pivot plate.

6. The method of claim 1 further comprising:
utilizing at least three screws for coupling said adjustable pivot plate to said base portion of a hard disk drive housing.

7. A hard disk drive comprising:
a housing;
at least one disk coupled with the housing and rotatable relative to the housing, the disk defining an axis of rotation and a radial direction relative to the axis;
an adjustable pivot plate coupled directly with said housing such that access to at least one adjustment point of said adjustable pivot plate is provided regardless of a state of assembly of said hard disk drive; and
an actuator coupled directly with the adjustable pivot plate without modifying the actuator or requiring any additional components between the actuator and the adjustable pivot plate, said actuator coupled with the adjustable pivot plate such that an adjustment to said at least one adjustment point of said adjustable pivot plate results in an adjustment to said actuator.

8. The hard disk drive of claim 7 wherein a screw is utilized at said adjustment point.

9. The hard disk drive of claim 7 wherein said actuator has a suspension for reaching over the disk, the suspension having a slider coupled therewith, said slider having a read/write head element on a trailing edge (TE) portion.

10. The hard disk drive of claim 9 wherein said adjustment to said at least one adjustment point of said adjustable pivot plate results in an offset adjustment between said read/write head element and a surface of said disk.

11. The hard disk drive of claim 7 wherein said adjustment between said read/write head element and said disk pack is based on a measured offset between said read/write head element and said disk in an assembled hard disk drive.

12. The hard disk drive of claim 7 wherein said adjustable pivot plate has at least three adjustment points to provide at least three degrees of freedom for adjusting said pivot plate.

13. The hard disk drive of claim 7 wherein at least one screw is utilized to couple said adjustable pivot plate with said housing.

14. A post-assembly head/disk offset adjuster comprising:
a housing;
a disk pack mounted to the housing and having a plurality of disks that are rotatable relative to the housing, the disk pack defining an axis of rotation and a radial direction relative to the axis;
an adjustable pivot plate mounted directly to said housing such that an adjustment to said adjustable pivot plate may be made regardless of a state of assembly of said hard disk drive; and
an actuator mounted directly to the adjustable pivot plate without modifying the actuator or requiring any additional components between the actuator and the adjustable pivot plate, the actuator having a suspension for reaching over the disk, the suspension having a slider coupled therewith, said slider having a read/write head element on a trailing edge (TE) portion of said slider, said actuator mounted to the adjustable pivot plate such that an adjustment to said adjustable pivot plate results in an adjustment between said read/write head element and a surface of a disk in said disk pack regardless of the state of assembly of said hard disk drive.

15. The post-assembly head/disk offset adjuster of claim 14 wherein said adjustable pivot plate has at least one adjustment point between said pivot plate and said housing.

16. The post-assembly head/disk offset adjuster of claim 14 wherein at least one screw is utilized to couple said adjustable pivot plate with said housing.

17. The post-assembly head/disk offset adjuster of claim 14 wherein said adjustable pivot plate has at least three adjustment points to provide at least three degrees of freedom for adjusting said pivot plate.

18. The post-assembly head/disk offset adjuster of claim 14 wherein said adjustment between said read/write head element and said disk pack is based on a measured offset between said read/write head element and said disk in an assembled hard disk drive.

* * * * *